US007869937B2

(12) United States Patent
Kim

(10) Patent No.: US 7,869,937 B2
(45) Date of Patent: Jan. 11, 2011

(54) METHOD FOR PROCESSING MULTIMEDIA BROADCASTING DATA IN WIRELESS TERMINAL WHILE DRIVING VEHICLE

(75) Inventor: Soon-Jin Kim, Daegu (KR)

(73) Assignee: Samsung Electronics Co., Ltd (KR)

( * ) Notice: Subject to any disclaimer, the term of this patent is extended or adjusted under 35 U.S.C. 154(b) by 1099 days.

(21) Appl. No.: 11/546,049

(22) Filed: Oct. 11, 2006

(65) Prior Publication Data

US 2007/0093956 A1 Apr. 26, 2007

(30) Foreign Application Priority Data

Oct. 26, 2005 (KR) ...................... 10-2005-0101403

(51) Int. Cl.
*G01C 21/00* (2006.01)

(52) U.S. Cl. ...................... 701/200; 701/2; 340/426.34; 340/425.5; 340/462; 340/438; 340/995.1; 455/3.02; 455/344; 455/345; 455/346; 345/156; 348/729; 361/2; 463/40; 711/E21.034

(58) Field of Classification Search ..................... 701/2, 701/200; 340/426.34, 425.5, 462, 438, 461, 340/995.1; 455/3.02, 344, 346, FOR. 215; 345/156; 348/729, FOR. 169, FOR. 170; 381/2; 463/40; 711/E12.034
See application file for complete search history.

(56) References Cited

U.S. PATENT DOCUMENTS

| | | | | |
|---|---|---|---|---|
| 4,564,917 | A * | 1/1986 | Yamada et al. | 701/1 |
| 5,404,443 | A * | 4/1995 | Hirata | 725/75 |
| 5,510,983 | A * | 4/1996 | Iino | 701/1 |
| 5,781,872 | A * | 7/1998 | Konishi et al. | 701/36 |
| 5,951,621 | A * | 9/1999 | Palalau et al. | 340/995.2 |
| 6,029,110 | A * | 2/2000 | Zuber et al. | 701/200 |
| 6,088,652 | A * | 7/2000 | Abe | 701/208 |
| 6,122,682 | A * | 9/2000 | Andrews | 710/65 |
| 6,144,296 | A * | 11/2000 | Ishida et al. | 340/461 |
| 6,266,589 | B1 * | 7/2001 | Boies et al. | 701/36 |
| 6,449,535 | B1 * | 9/2002 | Obradovich et al. | 701/1 |
| 7,650,569 | B1 * | 1/2010 | Allen et al. | 715/720 |
| 7,673,212 | B2 * | 3/2010 | Ji | 714/752 |
| 2002/0171627 | A1 * | 11/2002 | Noguchi et al. | 345/156 |
| 2005/0128121 | A1 | 6/2005 | Kroculick | |
| 2005/0160343 | A1 * | 7/2005 | Ji | 714/758 |

(Continued)

FOREIGN PATENT DOCUMENTS

| | | |
|---|---|---|
| EP | 0 846 588 | 6/1998 |

(Continued)

*Primary Examiner*—Khoi Tran
*Assistant Examiner*—Jorge O Peche
(74) *Attorney, Agent, or Firm*—The Farrell Law Firm, LLP

(57) ABSTRACT

Disclosed is a method for processing a multimedia broadcasting in a portable terminal having a navigation module, while a vehicle is being driven. The method includes steps of: proceeding to a vehicle driving mode, if it is recognized that the vehicle is currently being driven when the multimedia broadcasting data is outputted; confirming at least one vehicle driving function set as the vehicle driving mode in the vehicle driving mode and driving navigation module, and then acquiring vehicle driving information; and reflecting the acquired vehicle driving information in the vehicle driving function and then outputting the multimedia broadcasting data after applying the vehicle driving function to the multimedia broadcasting data.

9 Claims, 9 Drawing Sheets

U.S. PATENT DOCUMENTS

2005/0257236 A1* 11/2005 Ando .......................... 725/37
2006/0111827 A1* 5/2006 Russlies et al. ............... 701/49
2008/0309474 A1* 12/2008 Okamoto et al. ............ 340/462

FOREIGN PATENT DOCUMENTS

GB 2 353 872 3/2001
JP 60165177 A * 8/1985
JP 2002-019533 1/2002
JP 2004180201 A * 6/2004

* cited by examiner (E)

(F)

(G)

METHOD FOR PROCESSING MULTIMEDIA BROADCASTING DATA IN WIRELESS TERMINAL WHILE DRIVING VEHICLE

PRIORITY

This application claims priority to an application entitled "Method for Processing Multimedia Broadcasting Data by Wireless Terminal While Driving Vehicle" filed with the Korean Intellectual Property Office on Oct. 26, 2005 and assigned Ser. No. 2005-101403, the contents of which are incorporated herein by reference.

BACKGROUND OF THE INVENTION

1. Field of the Invention

The present invention relates to a method of processing digital broadcasting data in a portable terminal with a navigation function, and in particular, to a method of processing digital broadcasting data in a portable terminal with a navigation function while in a moving vehicle.

2. Description of the Related Art

Global Positioning Systems (GPSs) were originally used by the U.S. Department of Defense (DoD) for military purposes such as to determine an object's physical position and for guiding munitions to their intended target(s). However, due to the economic utility and usefulness, the use of GPS systems has been rapidly extended to non-military use (i.e., civilian use). Today, civilian GPS systems are commercially available and widely used. In particular, a navigation system indicates the current position, the moving velocity, the proceeding direction, and the distance and optimal path to the desired goal from the present position of a moving body on a geographical information system (GIS) map displayed on a display screen, using GPS receiving information. In addition, the GPS function is applied to various systems beyond navigation systems so as to provide more efficient services. For example, mobile terminals may use a GPS system to identify a caller's location in an emergency.

Digital broadcasting means a broadcasting service for providing high definition video and audio, and higher grade services and can in substitute analog broadcasting. Recently, there has been a growing interest in digital broadcasting, which enable the watching of digital broadcasting even during movement, due to the development of digital broadcasting and mobile communication technologies. In particular, there has been a growing interest in digital multimedia broadcasting (DMB) service using a portable terminal. DMB services make it possible to view various multimedia broadcasting with multiple channels through a personal portable receiver or a vehicle receiver, which is equipped with a non-directional antenna.

However, if the DMB service is viewed through a personal portable receiver or a vehicle receiver, which is equipped with a non-directional antenna in a vehicle while being driven, that is, if a user is in a moving vehicle (e.g., a vehicle, boat, plane, train, bus, elevator, etc.) and watches the DMB service while driving a vehicle, an accident may occur due to the user's carelessness.

SUMMARY OF THE INVENTION

Accordingly, the present invention has been made to solve the above-mentioned problem occurring in the prior art, and an object of the present invention is to provide a method of processing digital broadcasting data when a user watches a DMB service while driving a vehicle.

In order to achieve the above-mentioned object, there is provided a method of processing multimedia broadcasting in a portable terminal with a navigation module, while driving a vehicle, including steps of: proceeding to a vehicle driving mode if the vehicle is recognized as being driven when the multimedia broadcasting data is outputted; confirming at least one vehicle driving function which is set for the vehicle driving mode in the vehicle driving mode and driving navigation module and then acquiring vehicle driving information; and reflecting the acquired vehicle driving information in the vehicle driving function and then outputting the multimedia broadcasting data after applying the vehicle driving function to the multimedia broadcasting data.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description, a detailed description of known functions and configurations incorporated herein will be omitted when it may make the subject matter of the present invention rather unclear. In addition, terminologies used herein are selected in consideration of functions in the present invention, which may be different from those used by the persons ordinarily skilled in the art, and the definitions of the terminologies shall be determined on the basis of the contents generally described in the specification. The term, "multimedia broadcasting data" used herein includes "digital multimedia data" and "analogue broadcasting data" unless it is otherwise specifically defined. The DMB service includes a satellite DMB service and a terrestrial DMB service. The following description will be made in terms of the satellite DMB service. However, it will be apparent that the method of processing a multimedia broadcasting service to be described later is also applicable to an terrestrial DMB service and to analog broadcasting service, beyond the DMB service to be described below.

Figure 1:
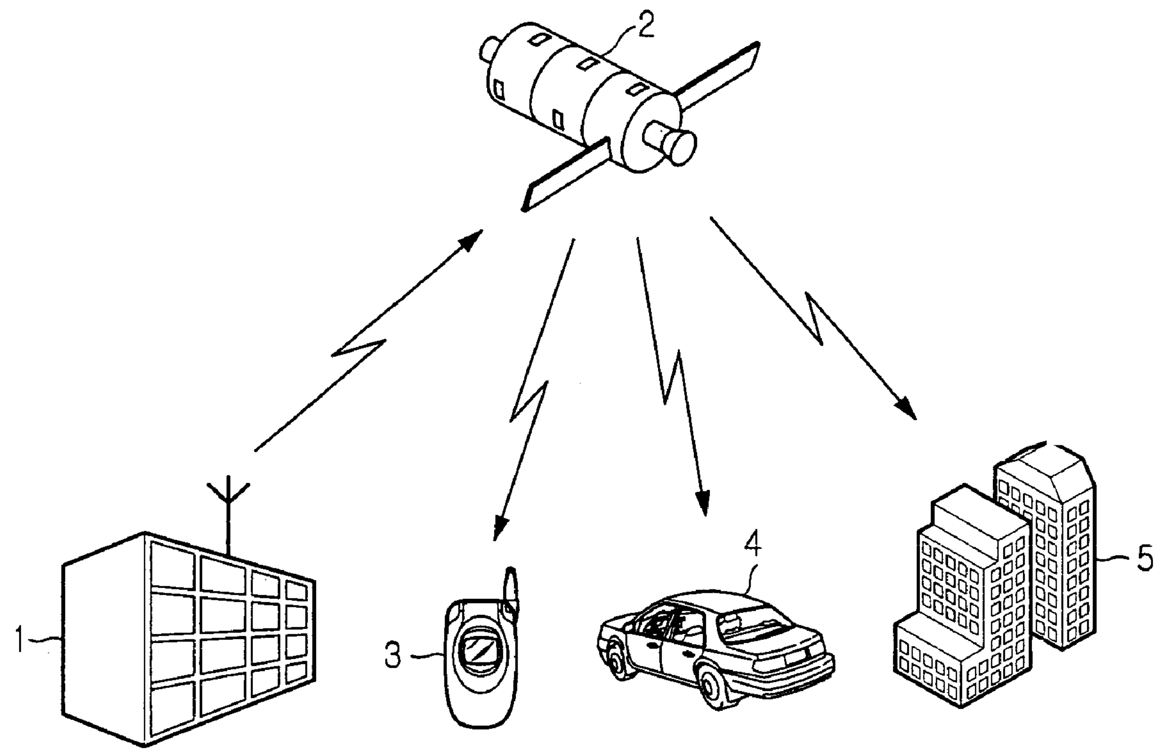
FIG. 1 is a diagram illustrating a configuration of a system for providing a digital multimedia broadcasting (DMB) service.

FIG. 1 is a diagram illustrating the configuration of a system for providing a DMB service. The system for executing a DMB service includes a data delivery center 1, a satellite 2, and receivers (for example, a portable terminal 3, a vehicle receiver 4, and a home receiver 5, etc).

The data delivery center 1 transmits DMB data (for example, image, voice, and data signals) to the satellite 2 after compressing and modulating the DMB data.

The satellite 2 receives, amplifies, and frequency-converts the signals transmitted from the data delivery center 1 and retransmits the amplified signals to the Earth.

The receivers 3, 4, and 5 receive and demodulate the signals from the satellite 2, release the compression of the signals (i.e., decompress, and output retransmitted the original signals after converting the compression-released signals into the original signals.

Figure 2:
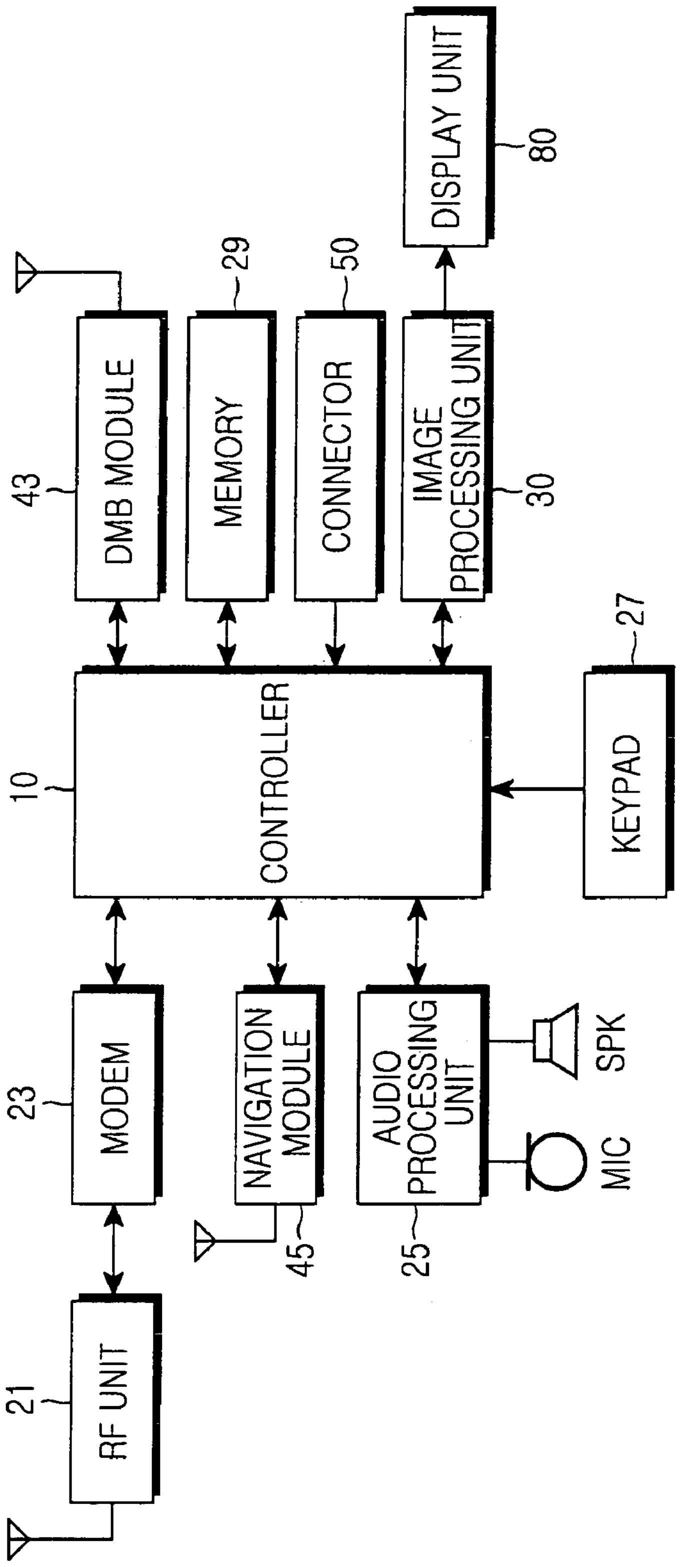
FIG. 2 is a block diagram illustrating a portable terminal including a navigation module, wherein the portable terminal can be also used for receiving digital broadcasting, according to an embodiment of the present invention.

FIG. 2 is a block diagram illustrating a portable terminal including a navigation module, wherein the portable terminal can also be used for receiving digital broadcasting, according to an embodiment of the present invention. The present embodiment is described assuming that a controller 10 and a DMB module 43 are physically separated from each other. However, it is also possible to configure both components on a single chip (for the sake of convenience, the chip is referred to as a "controller"). In addition, it is possible to further provide a multimedia module for taking complete charge of processing DMB data.

Referring to FIG. 2, an RF unit 21 performs communication functions for the portable terminal. The RF unit 21 includes an RF transmitter for up-converting and amplifying the frequency of signals to be transmitted, and an RF receiver for low-noise amplifying and down-converting received signals.

A modem 23 includes a transmitter for coding and modulating the signals to be transmitted, and a receiver for demodulating and decoding the received signals.

An audio processing unit 25 may include a CODEC (not shown), having a data CODEC for processing packet data and an audio CODEC for processing audio signals such as voice signals. The audio processing unit 25 may convert digital audio signals into analogue signals, thereby reproducing analogue signals or convert analogue signals generated and transmitted from a microphone into digital audio signals through the audio CODEC, thereby transmitting the digital audio signals to the modem 23.

A keypad 27 includes keys for inputting numeral and/or letter information, and function keys for entering various functions. In addition, the keypad 27 may include a DMB mode activating key, a DMB vehicle driving mode setting key, a selecting key or the like according to an embodiment of the present invention.

The various the functions of the portable terminal, including a portable phone function and associated information, are stored in a memory 29 (e.g., RAM and/or ROM, etc.). In addition, according to an embodiment of the present invention, information and programs related to the provision of the DMB service can be stored in the memory 29. Furthermore, the memory 29 is stored with the whole programs for executing the navigation function. Moreover, the memory 29 is also stored with a program for processing multimedia broadcasting data in the vehicle driving mode while the vehicle is being driven.

An image processing unit 30 transmits received image data in such a manner as to meet with the standard of a display unit 80 under the control of the controller 10. The data transmitted by the image processing unit 30 corresponds with the display unit 80 such that the transmitted data is properly displayed. The image processing unit 30 also compresses and/or expands the image data as necessary. In addition, the image processing unit 30 transmits a value of initial address of the image data outputted to the display unit or changes and sets the value of initial address under the control of the controller 10.

A display unit 80, may include a memory for storing image data and an optional liquid crystal display (LCD) display device. Here, if the LCD is implemented using a touch-screen type display, the keypad 27 and/or the LCD can be used as input units. The display unit 80 can also include an image data display unit, on which image data is output.

A navigation module 45 collects vehicle driving information, i.e., moving distance information, velocity information and direction information concerning the portable terminal as it moves, and traffic information (for example, frequent accident area information, road information, and traffic congestion information) and transmits the information to the controller 10. In addition, the navigation module 45 can determine the moving distance information, the direction information, and the velocity information using latitudinal and longitudinal data, a map, and/or a separate sensor.

A DMB module 43 includes a receiver for receiving DMB RF (radio frequency) through an antenna and a demodulator. However, for the sake of clarity, as the invention is not related to such a detailed construction of the DMB module, the components are not shown in detail.

A connector 50 employed in the present embodiment may be an ordinary connector for use in charging a battery or a separate connector (or port) adapted to be connected to the vehicle. Upon being connected to the vehicle, the connector 50 sends a signal, which indicates that the vehicle is in the course of being driven, to the controller 10 when the connector 50 is connected to the vehicle. Depending on the purpose of use, the connector 50 may be called as a vehicle driving recognizing connector.

The controller 10 serves to control the operation of the portable terminal. In addition, the controller 10 may include the modem 23 and the CODEC. According to an embodiment of the present invention, if a vehicle driving function setting key is inputted, the controller 10 controls the portable terminal so that a DMB vehicle driving function list is displayed, and if a certain item is selected from the displayed DMB vehicle driving function list, the controller 10 controls the portable terminal so that a function corresponding to the selected item is set as a DMB vehicle driving function. When multimedia broadcasting data is outputted, the controller 10 determines whether the vehicle driving recognizing connector is connected If it is determined that the connector is connected, the controller 10 recognizes that the vehicle is in the course of being driven and determines whether the function for processing the multimedia broadcasting data as the vehicle driving mode is set. If it is determined that the function for processing the multimedia broadcasting data as the vehicle driving mode is set, the controller 10 controls and drives the navigation module 45 so as to acquire vehicle driving information and process the multimedia broadcasting data after the controller 10 applies the acquired vehicle driving information to the multimedia broadcasting data.

The operation of the portable terminal is now described with reference to FIG. 2. In a call origination mode, if the user sets a signal sending mode through the keypad 27 (or other input device) after dialing, the controller 10 senses this and processes the dial information received through the keypad 27, and then converts the dial information into an RF signal through the RF unit 21, thereby outputting the RF signal for communicating. Thereafter, if a counterpart subscriber generates a response signal, the response signal is sensed by the RF unit 21 and the modem 23. Thereafter, a speech path is formed through the audio processing unit 25, so that the communication function can be executed. In the call termination mode, the controller senses the call termination mode through the modem 23 and generates a ring signal through the audio processing unit 25. Thereafter, if the portable terminal's user replies, the controller 10 senses this and a speech path is also formed through the audio processing unit 25, so that the communication function can be executed. Although the call origination and termination modes are described in terms of voice communication by way of an example, a data communication function for communicating packet data and image data can be also executed in addition to a voice communication.

Referring to the operation of the above-mentioned portable terminal for processing digital broadcasting data while the vehicle is being driven, if the user inputs a DMB service execution key using the keypad 27 (or other input device), the controller 10 controls the DMB module 43 to output the multimedia broadcasting data. Then, the controller 10 determines whether the connector 50 is connected. If it is determined that the connector 50 is connected, the controller 10 recognizes that the vehicle is in the course of being driven and determines whether the function for processing the multimedia broadcasting data as the vehicle driving mode is set. If it is determined that the function for processing the multimedia broadcasting data as the vehicle driving mode is set, the controller 10 controls and drives the navigation module 45 so as to acquire vehicle driving information, reflects the acquired vehicle driving information in the vehicle driving function, and processes the multimedia broadcasting data after applying the vehicle driving information to the multimedia broadcasting data.

Figure 3A:
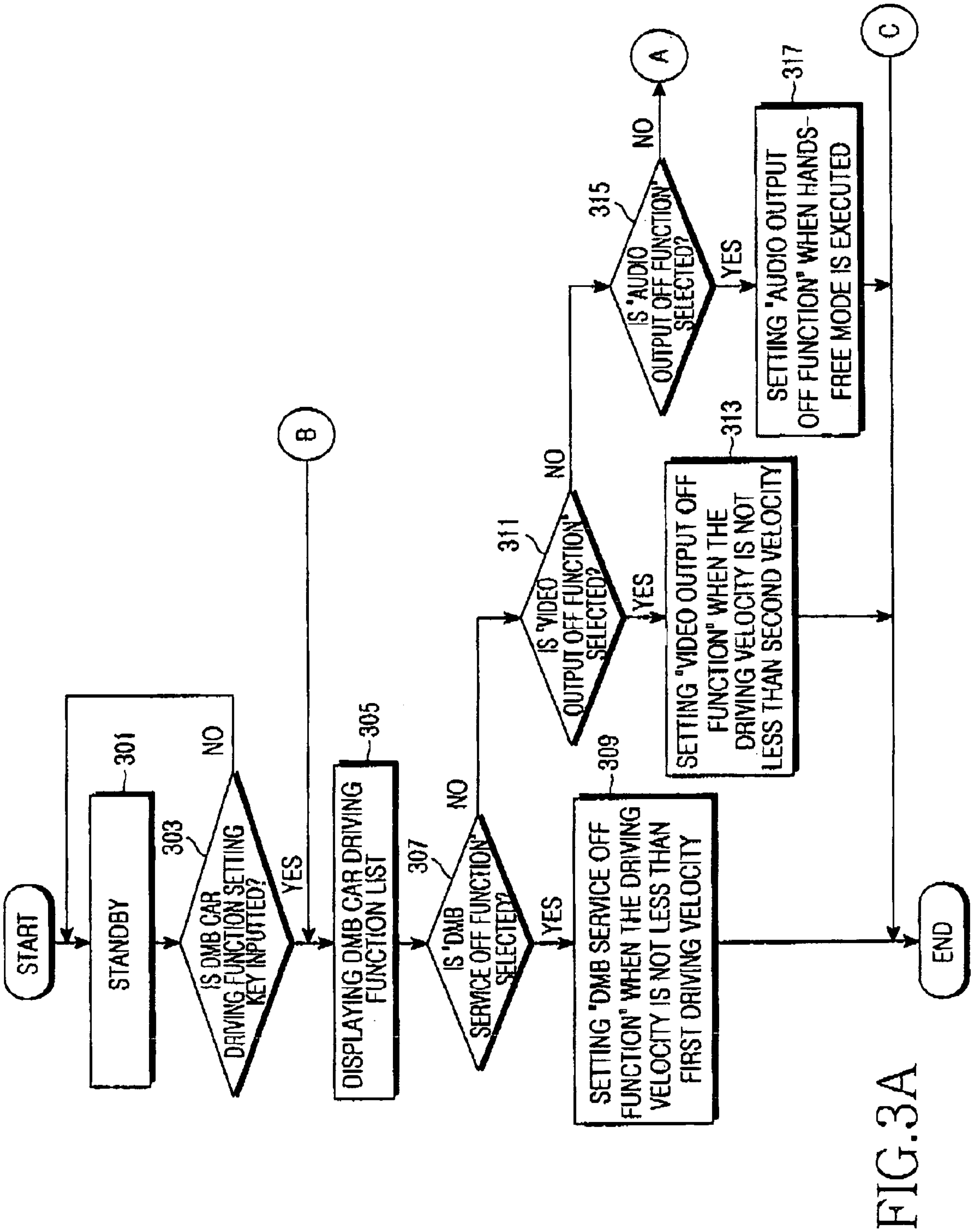
FIGS. 3A and 3B are flowcharts illustrating a method for setting a DMB vehicle mode according to an embodiment of the present invention.
Figure 3B:
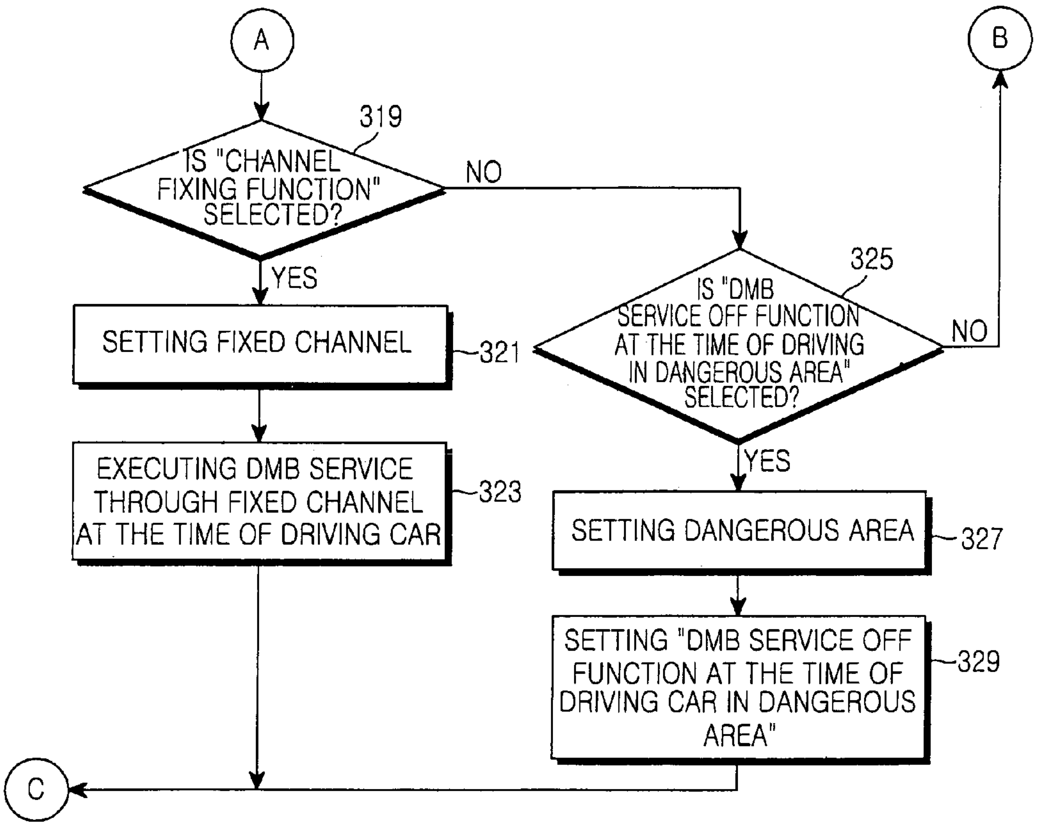

FIGS. 3A and 3B are flowcharts illustrating a method for setting the DMB vehicle driving function according to an embodiment of the present invention. The operation for setting the DMB vehicle driving function in order to process digital broadcasting data outputted while the vehicle is in the course of being driven will now described with reference to FIGS. 3A and 3B. In step 301, when the portable terminal is in a stand-by state, if the user inputs the DMB vehicle driving function setting key using the keypad 27, the controller senses this in step 303 and proceeds to step 305. In step 305, the controller 10 is switched to the DMB vehicle driving function setting mode and controls the memory 29 and the display unit 80 so as to display a DMB vehicle driving function list as indicated Table 1 below.

TABLE 1

| | DMB vehicle driving function list |
|---|---|
| 1 | DMB service OFF function |
| 2 | video output OFF function |
| 3 | audio output OFF function |
| 4 | channel fixing function |
| 5 | DMB service OFF function at the time of driving a vehicle in a dangerous area |

First, if the user selects item No. 1 i.e., the "DMB service OFF function," from the DMB vehicle driving function list as indicated in Table 1 using the keypad 27, the controller 10 senses this in step 307 and proceeds to step 309. In step 309, the controller 10 controls the memory 29 so as to set the function of turning off the DMB service, which is in the course of being executed, when the driving velocity of the vehicle is greater than or equal to a first velocity. Referring to the "DMB service OFF function" as an example, in a case in which the user turns on and watches the DMB service while driving the vehicle, the DMB service, which is in the course of being executed, is interrupted when the driving velocity of the vehicle is greater than or equal to the first velocity (for example, 120 km/h). Here, the driving velocity can be sensed by the navigation module and the first velocity can be variously set according to the user's selection or input.

Second, if the user selects item No. 2, i.e., the "video output OFF function," from the DMB vehicle driving function list as indicated in Table 1 using the keypad 27, the controller 10 senses this in step 311 and proceeds to step 313. In step 313, the controller 10 controls the memory 29 so as to set the function of turning off the output of the video data in the DMB service, which is in the course of being executed, when the vehicle is driven in a velocity exceeding second velocity. Referring to the "video output OFF function" as an example, in a case in which the user turns on and watches the DMB service while driving the vehicle, the output of the video data is interrupted in the DMB service, which is in the course of being executed, when the driving velocity of the vehicle exceeds the second velocity (for example 70 km/h). Here, the second velocity can be variously set according to the user's selection or input.

Third, if the user selects item No. 3, i.e., the "audio output OFF function," from the DMB vehicle driving function list as indicated in Table 1 using the keypad 27, the controller senses this in step 315 and proceeds to step 317. In step 317, the controller 10 controls the memory 29 so as to set the function of turning off the output of the audio data in the DMB service, which is in the course of being executed, when a hands-free mode execution signal is sensed. Here, the hands-free mode execution signal is a signal outputted when the user executes a hands-free function or a speaker phone function. Referring to the "audio output OFF function" as an example, in a case in which the user turns on and watches the DMB service, the output of the audio data is interrupted in the DMA service, which is in the course of being executed, if the user using the hands-free function or the speaker phone function. Here, the hands-free function allows the user to speak by phone without the use of hands. For this function, if a hands-free unit, which is similar to an amplifier for amplifying voice, is mounted in the vehicle and connected to a portable phone through a wired or wireless connection, the driver can speak by phone without picking up the portable phone. The speaker phone function allows the user to speak by phone without the use of hands. For this function, a speaker and a microphone is housed in the portable terminal.

Fourth, if the user selects item No. 4, i.e., the "channel fixing function," from the DMB vehicle driving function list as indicated in Table 1 sing the keypad 27, the controller senses this in step 319 and proceeds to step 321. In step 321, the controller 10 controls the memory 29 and the display unit 80 so as to display a channel input window or a channel list for setting a fixed channel adapted to be fixedly selected always when the vehicle is driven. If the user inputs or selects the channel adapted to be fixedly selected always when the vehicle is driven using the keypad 27, the controller 10 controls the memory 29 in step 323 so as to set the inputted or selected channel as the fixed channel. Referring to the "channel fixing function" as an example, in a case in which the user sets channel "No. 7" as the fixed channel, if the user turns on the DMB service while driving the vehicle, the DMB service is always executed through "No. 7" set by the user.

Fifth, if the user selects No. 5, i.e., the "DMB service OFF function at the time driving a vehicle in a dangerous area" from the DMB vehicle driving function list as indicated in Table 1 using the keypad 27, the controller 10 senses this in step 325 and proceeds to step 327. In step 327, the controller 10 controls the memory 29 and the display unit 80 so as to display a dangerous area list as shown in Table 2 below for selecting one or more dangerous areas.

TABLE 2

| | dangerous area list |
|---|---|
| 1 | highway |
| 2 | curved area |
| 3 | frequent accident area |

If the user uses selects and sets at least one dangerous area as indicated in the dangerous area list using the keypad 27, the controller 10 controls the memory 29 in step 327 so as to set the function of turning off the DMB service, which is in the course of being executed, if the vehicle is driven in the dangerous area set by the user. Referring to the "DMB service OFF function at the time of driving a vehicle in a dangerous area" as an example, in a case in which the user sets "highway" and "frequent accident area" in the "dangerous area list," if the vehicle enters a highway or a frequent accident area" while the DMB is being executed and the vehicle is being driven, the execution of the DMB service is interrupted. Here, the information for sensing the dangerous areas can be sensed using the navigation module.

Figure 4A:
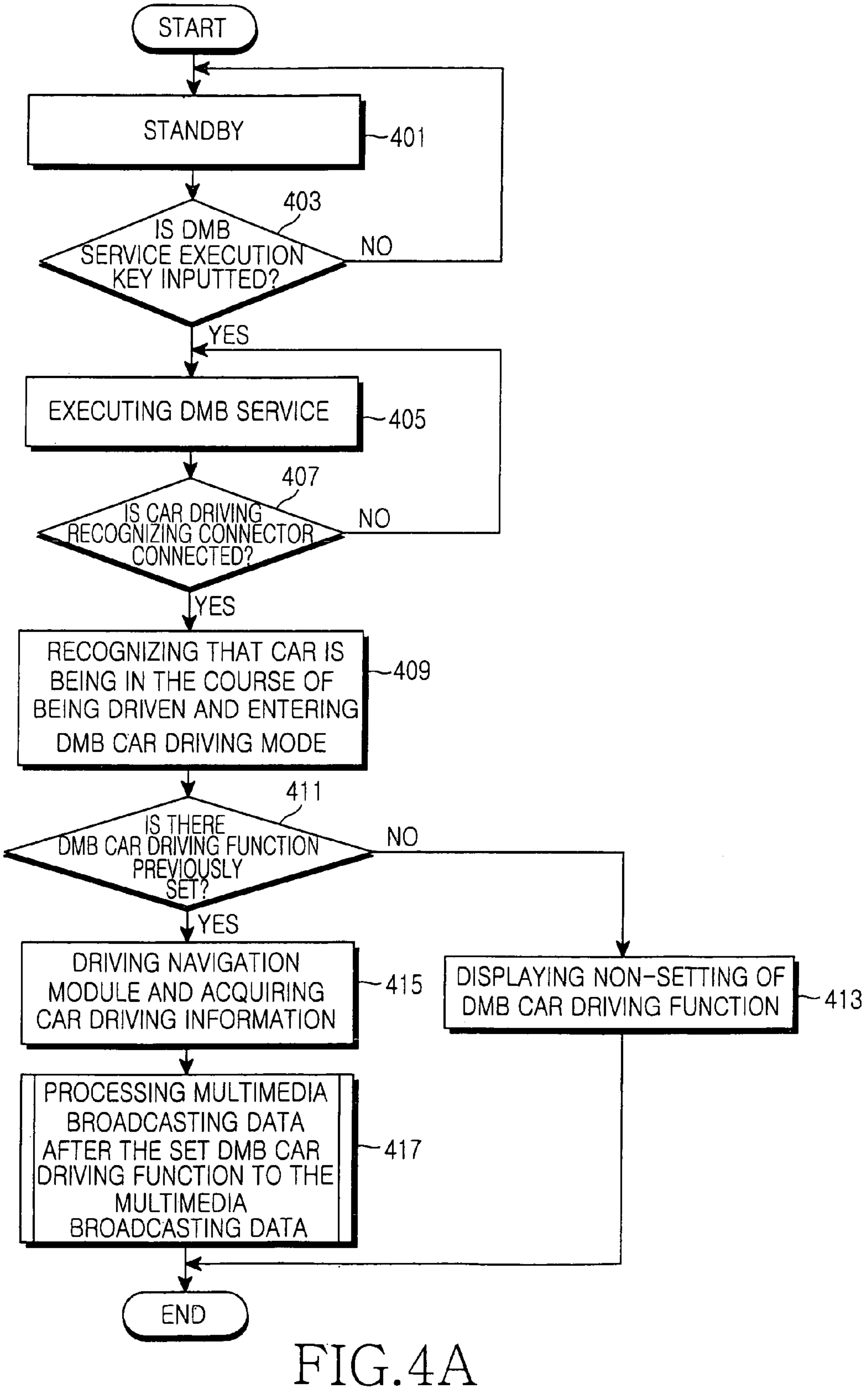
FIGS. 4A, 4B and 4C are flowcharts illustrating a method for executing a DMB vehicle mode according to an embodiment of the present invention.
Figure 4B:
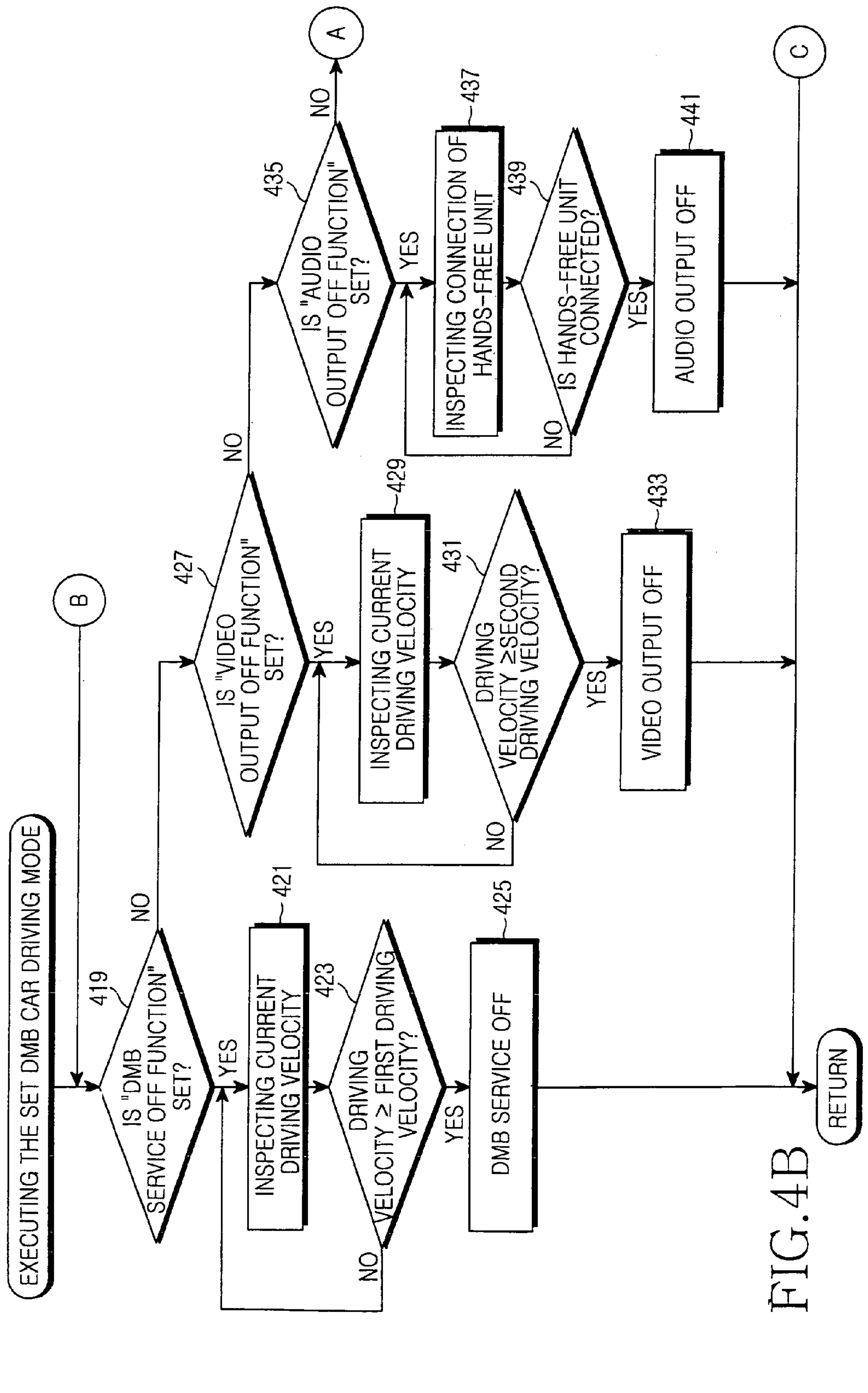
Figure 4C:
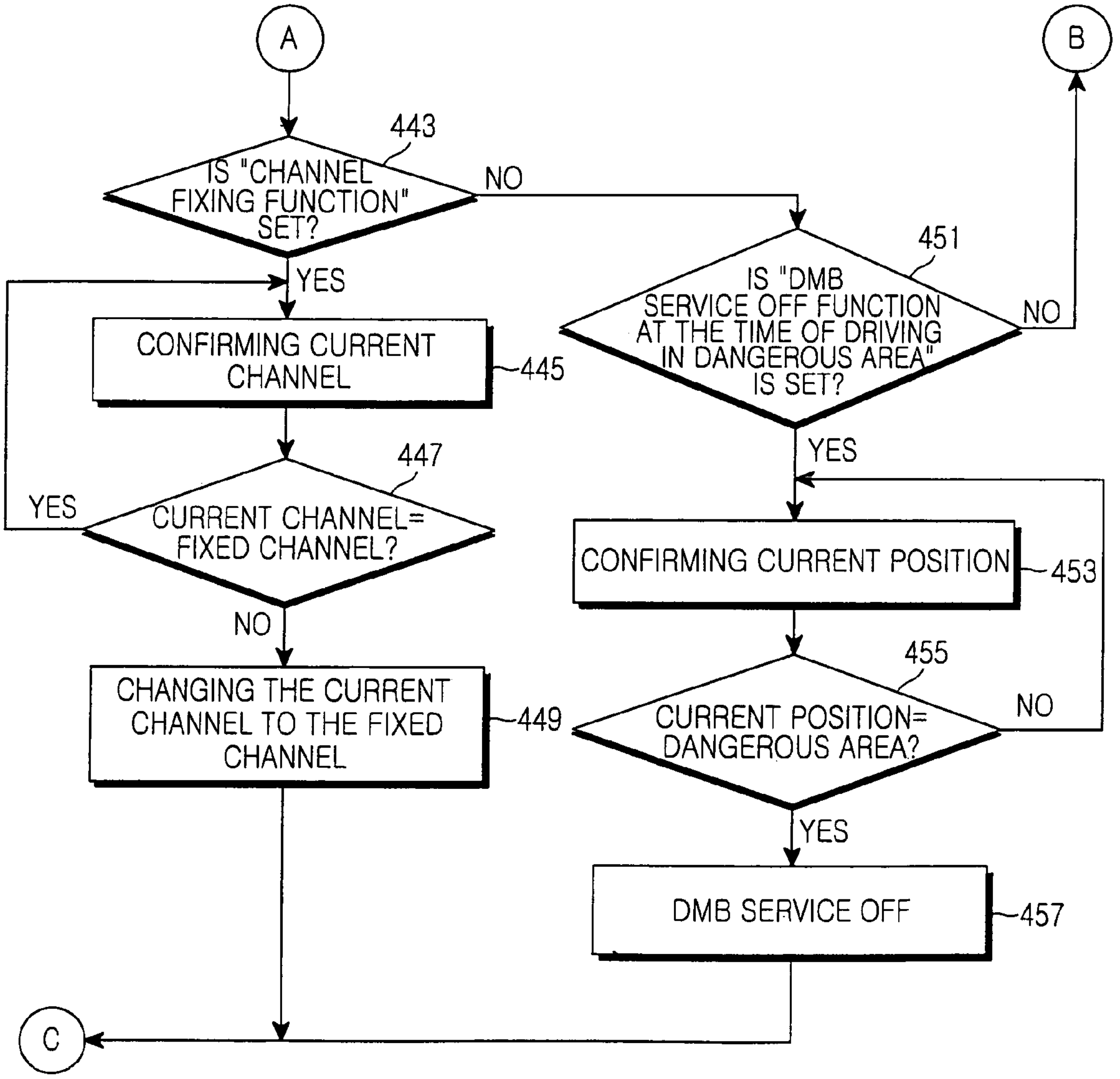
Figure 5A:
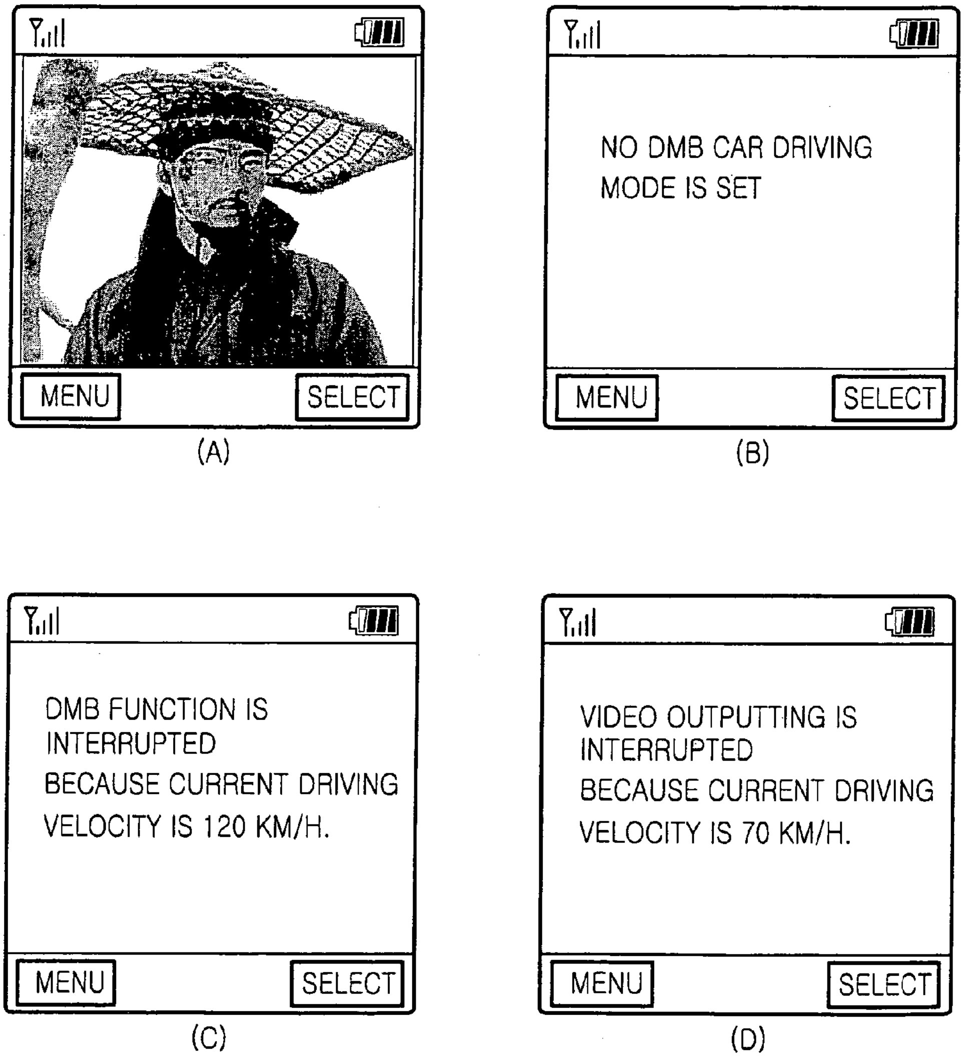
FIGS. 5A and 5B illustrate various display screens which can be outputted while the DMB vehicle mode is being executed according to an embodiment of the present invention.
Figure 5B:
Figure 5B:
Figure 5B:
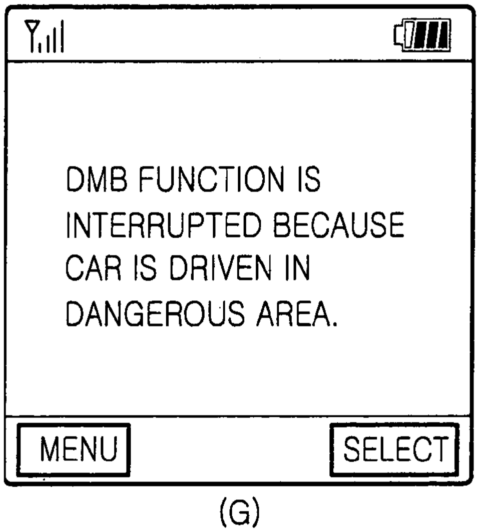

FIGS. 4A to 4C are flowcharts illustrating a method for executing the DMB vehicle mode according to an embodiment of the present invention. FIGS. 5A and 5B illustrate display screens outputted while the DMB vehicle mode is being executed according to an embodiment of the present invention.

The operation for executing the DMB vehicle driving function so as to process digital broadcasting data outputted from the portable terminal having a navigation module and a vehicle driving recognizing connector is now described with reference to FIGS. 4A to 4C and 5. In step 401, when the portable terminal is in the standby state, if the user inputs the DMB service execution key using the keypad 27, the controller 10 senses this in step 403 and proceeds to step 405. In step 405, the controller 10 controls the DMB module 43 so as to execute the DMB service and receive the multimedia broadcasting data through the system as shown in FIG. 1, thereby outputting the multimedia broadcasting data as shown in FIG. 5A (A).

In addition, the controller 10 determines whether the connector (vehicle driving recognizing connector) 50 is connected to the vehicle. If it is determined that the connector 50 is not connected to the vehicle, the controller causes an ordinary DMB service to be executed, and if it is determined that the connector 50 is connected to the vehicle, the controller 10 identifies that the vehicle is in a driving state in step 409 and controls the memory 29 to enter the DMB vehicle driving mode. Here, the "driving state" means the state in which the user personally drives a vehicle, and the "DMB vehicle driving mode" means the mode for processing the digital broadcasting data outputted while the vehicle is being driven after applying the DMB vehicle driving function set as shown in FIG. 3 to the digital broadcasting data.

If the portable terminal enters the DMB vehicle driving mode, the controller 10 controls the memory 29 in step 411 so as to determine whether there is a previously set DMB vehicle driving function. If it is determined that no DMB vehicle driving function is previously set, the controller 10 proceeds to step 413. In step 413, the controller controls the memory 29 and the display unit 80 so as to display a message indicating that no DMB vehicle driving function is set as shown in FIG. 5A (B). If a predetermined length of time has passed after the display of the message, the message disappears. If so, it is possible to continuously execute the DMB or enter the DMB vehicle driving function setting mode so as to set a DMB vehicle driving function as shown in FIG. 3.

However, if the DMB vehicle driving function were set, the controller 10 proceeds to step 415. In step 415, the controller 10 controls and drives the navigation module 45 so as to estimate the information of moving distance, direction and velocity using latitudinal and longitudinal data, a map and/or a separate sensor, and the controller 10 receives traffic information, thereby acquiring vehicle driving information. Here, the "vehicle driving information" includes moving distance information of the portable terminal connected to the vehicle, direction information, driving velocity information, and traffic information (for example, frequent accident area information, road information, traffic congestion information).

Then, the controller 10 controls the memory 29 in step 417 so as to reflect the acquired vehicle driving information in the previously set DMB vehicle driving function, and to process the multimedia broadcasting data after applying the DMB vehicle driving function to the multimedia broadcasting data.

The operation of processing the multimedia broadcasting data after applying the DMB vehicle driving function to the multiple broadcasting data is described in detail with reference to FIGS. 4B and 4C.

First, if the "DMB service OFF function" is set and the DMB service is executed while the vehicle is being driven, in step 419, the controller 10 controls the memory 29 so as to sense the setting of the "DMB service OFF function", and proceeds to step 421. In step 421, the controller 10 confirms the current driving velocity acquired from the navigation module 45, and proceeds to step 423. In step 423, the controller 10 controls the memory 29 so as to confirm the first driving velocity set by the user, i.e., the critical velocity for executing the "DMB service OFF function" and compares the first driving velocity and the current driving velocity acquired from the navigation module 45. If the current driving velocity is greater than or equal to the first driving velocity, the controller 10 proceeds to step 425, in which step the controller 10 interrupts the DMB service which is in the course of being executed, and controls the memory 29 and the display unit 80 so as to display the execution of the DMB service OFF function. For example, in a case in which the user turns on and watches the DMB service while driving the vehicle, if the driving velocity of the vehicle is greater than or equal to the first velocity (for example, 120 km/h), the controller 10 interrupts the DMB service, which is in the course of being executed, so as to turn off the output of the multimedia broadcasting data, whereby the display screen as shown in FIG. 5A (C) is displayed.

Second, in a case in which the "video output OFF function" is set and the DMB service is executed, in step 427, the controller 10 controls the memory 29 so as to sense the setting of the "video output OFF function", and proceeds to step 429. In step 429, the controller 10 confirms the current driving velocity acquired from the navigation module 45, and then proceeds to step 431. In step 431, the controller 10 controls the memory 29 so as to confirm the second driving velocity, i.e., the critical velocity for executing the "video output OFF function" and then compares the second driving velocity with the current driving velocity acquired from the navigation module 45. If the current driving velocity is greater than or equal to the second driving velocity, the controller 10 proceeds to step 433, in which step the controller 10 turns off the output of the video data in the multimedia broadcasting data outputted through the DMB service and controls the memory 29 and the display unit 80 so as to display the execution of the "video output OFF function". For example, in a case in which the user turns on and watches the DMB service while driving the vehicle, if the driving velocity of the vehicle is greater than or equal to the second velocity (for example, 70 km/h), the controller 10 turns off the output of the video data in the multimedia broadcasting data outputted through the DMB service, which is in the course of being executed, and causes the display screen as shown in FIG. 5A (D) to be displayed.

Third, in a case in which the "audio output OFF function" is set and the DMB service is executed while the vehicle is being driven, in step 435, the controller 10 controls the memory 29 so as to sense the setting of the "audio output OFF function," and proceeds to step 437. In step 437, the controller 10 inspects whether the hands-free unit is connected, and if a hands-free mode execution signal is outputted, the controller 10 senses this in step 439 and proceeds to step 441, so as to turn off the output of the audio data in the multimedia broadcasting data outputted through the DMB service and display the execution of the "audio output OFF function". For example, in a case in which the user turns on and watches the DMB service while driving the vehicle, if the user uses the hands-free unit, the output of the audio data in the multimedia broadcasting data output through the DMB service is turned off and the display screen as shown in FIG. 5B (E) is displayed. In addition, in a case in which the user speaks by phone using the speaker phone function, the controller 10 recognizes this as a hands-free mode execution signal, thereby turning off the output of the audio data in the multimedia broadcasting data output through the DMB service, and the controller 10 controls the memory 29 and the display unit 80 so as to display the execution of the "audio output OFF function."

Fourth, in a case in which the "channel fixing function" is set and the DMB service is executed while the vehicle is being driven, the controller 10 controls the memory 29 in step 443 so as to sense the setting of the "channel fixing function" and then proceeds to step 445. In step 445, the controller 10 controls the memory 29 so as to confirm the channel of the DMB service, which is currently being executed. Here, the channel of the DMB service, which is currently being executed, can be confirmed from EPG (Electronic Program Guide) information. Because the EPG continuously resends information in a predetermined period, the user can receive and store the EPG information regardless of when the user uses the DMB service.

If the channel of the DMB service, which is currently being executed, the controller 10 proceeds to step 447, in which step the controller 10 controls the memory 29 confirms the fixed channel, i.e., the channel set for executing the "channel fixing function," and compares the fixed channel and the channel of the DMB service, which is currently being executed. If the channels are identical, the controller 10 maintains the channel of the DMB service, which is currently being executed, and if the channels are not identical, the controller 10 changes the currently executed channel to the fixed channel, so that the DMB service is executed through the fixed channel, thereby outputting the multimedia broadcasting data. For example, in a case in which the user sets channel "No. 7" as the fixed channel, if the user turns on the DMB service while driving the vehicle, the DMB service is executed through channel "No. 7" whereby the multimedia broadcasting data is output as shown in FIG. 5B (F).

Fifth, in a case in which the "DMB service OFF function at the time of driving a vehicle in a dangerous area" is set and the DMB service is executed while the vehicle is being driven, the controller 10 controls the memory 29 so as to sense the setting of the "DMB service OFF function at the time of driving a vehicle in a dangerous area" in step 451 and proceeds to step 453. The controller 10 confirms the current vehicle driving information acquired from the navigation module 45, i.e., the distance information, the direction information and the traffic information (for example, frequent accident area information, road information, traffic congestion information, etc.) and proceeds to step 455. In step 455, the controller 10 controls the memory 29 so as to compare the dangerous areas for executing the "DMB service OFF function at the time of driving a vehicle in dangerous area" and the current driving area acquired from the navigation module 45, and if the current driving area is included in the dangerous areas set by the user, the controller 10 proceeds to step 457, in which step the controller 10 interrupts the DMB service which is in the course of being executed, thereby turning off the output of the multimedia broadcasting data, and controls the memory 29 and the display unit 80, thereby displaying the execution of the "audio output OFF function." For example, in a case in which the user sets "highway" and "frequent accident area" as the dangerous areas, if the vehicle enters a highway or a frequent accident area while the user turns on the DMB service and drives the vehicle, the controller interrupts the DMB service which is in the course of being executed, thereby turning off the output of the multimedia broadcasting data and causing the display screen as shown in FIG. 5B (G) to be displayed.

As described above, because the present invention applies a vehicle driving function so as to process digital broadcasting data outputted from a portable terminal while a vehicle is being driven, it is possible to enhance safety while driving when a user watches the multimedia broadcasting while personally driving the vehicle, in particular when the user drives the vehicle at a high speed on a highway or across a dangerous area such as a frequent accident area.

While the invention has been shown and described with reference to certain preferred embodiments thereof, various changes and modifications can be made without departing from the scope and spirit of the present invention as defined by the appended claims. Therefore, the scope of the present invention shall be determined by the appended claims and equivalents thereof rather than by the embodiments described above.

What is claimed is:

1. A method of processing multimedia broadcasting in a portable terminal with a navigation module, while a vehicle is being driven, comprising:

entering a vehicle driving mode if it is determined that the vehicle is being driven when the multimedia broadcasting data is output;

determining vehicle driving functions set as the vehicle driving mode and driving a navigation module so as to acquire vehicle driving information; and reflecting the acquired vehicle driving information in the vehicle driving functions and then outputting the multimedia broadcasting data after applying the vehicle driving functions to the multimedia broadcasting data, wherein the vehicle driving functions include:

a function of turning off an output of the multimedia broadcasting data if a driving velocity of the vehicle is greater than or equal to a first driving velocity;

a function of turning off the output of video data in the multimedia broadcasting data if the driving velocity of the vehicle is greater than or equal to a second driving velocity;

a function of turning off the output of audio data in the multimedia broadcasting data when a hands-free mode is executed;

a function of outputting the multimedia broadcasting data through a fixed channel set when the vehicle is driven; and a function of turning off the output of the multimedia broadcasting data when the vehicle is driven in a dangerous area.

2. A method as claimed in claim 1, wherein the step of determining the vehicle is being driven includes:

determining whether a vehicle connector is connected to the vehicle; and recognizing that the vehicle is being driven if it is determined that the vehicle connector is connected vehicle.

3. A method as claimed in claim 1, wherein the vehicle driving information includes at least one of moving distance information, direction information, driving velocity information, and traffic information.

4. A method as claimed in claim 1, wherein the step of outputting the multimedia broadcasting data after applying the vehicle driving functions to the multimedia broadcasting data includes:

determining types of the vehicle driving functions;

determining a current driving velocity from the acquired vehicle driving information and comparing the current driving velocity with the first driving velocity, if it is determined that the function of turning off the output of the multimedia broadcasting data when the driving velocity is greater than or equal to the first driving velocity is set; and turning off the output of the multimedia broadcasting data if the current driving velocity is greater than or equal to the first driving velocity.

5. A method as claimed in claim 1, wherein the step of outputting the multimedia broadcasting data after applying the vehicle driving functions to the multimedia broadcasting data includes:

determining types of the vehicle driving functions;

determining a current driving velocity from the acquired vehicle driving information and comparing the current driving velocity with a second driving velocity, if it is determined that the function of turning off the output of the video data in the multimedia broadcasting data when the driving velocity is greater than or equal to the second driving velocity is set; and turning off the output of the video data in the multimedia broadcasting data if it is determined that the current driving velocity is greater than or equal to the second driving velocity.

6. A method as claimed in claim 1, wherein the step of outputting the multimedia broadcasting data after applying the vehicle driving functions to the multimedia broadcasting data includes:

determining types of the vehicle driving functions;

determining if the hands-free mode has been executed, if it is determined that the function of turning off the output of the audio data in the multimedia broadcasting data when the hands-free mode is executed is set; and turning off the output of the audio data in the multimedia broadcasting data, if it is determined that the hands-free mode has been executed.

7. A method as claimed in claim 1, wherein the step of outputting the multimedia broadcasting data after applying the vehicle driving functions to the multimedia broadcasting data includes:

determining types of the vehicle driving functions;

determining a channel of the multimedia broadcasting data which is currently being output, if it is determined that function of outputting the multimedia broadcasting data through the fixed channel was set, and determining whether the channel is identical to a predetermined channel; and changing the channel to the predetermined channel, and outputting multimedia broadcasting data corresponding to the predetermined channel, if it is determined that the channel is not identical to the fixed channel.

8. A method as claimed in claim 1, wherein the step of outputting the multimedia broadcasting data after applying the vehicle driving functions to the multimedia broadcasting data includes:

determining types of the vehicle driving functions;

determining a position of an area where the vehicle is currently being driven from the acquired vehicle driving information, and comparing the position with a dangerous area list set in the portable terminal, if it is determined that the function of turning off the output the multimedia broadcasting data when the vehicle is driven in a dangerous area is set; and turning off the output the video data in the multimedia broadcasting data if it is determined that the area where the vehicle is currently being driven is included in the dangerous area list set in the portable terminal.

9. A method as claimed in claim 1, further displaying a message indicating an applied vehicle driving function.

* * * * *